Sheet 1, 5 Sheets.

J. Winsborrow.
Liquid Meter.

Nº 96,858. Patented Nov. 16, 1869.

Witnesses.
William Brookes
Alfred George Brookes

Inventor:
John Winsborrow

Sheet 2, 5 Sheets.
J. Winsborrow.
Liquid Meter.
Nº 96,858.      Patented Nov. 16, 1869.
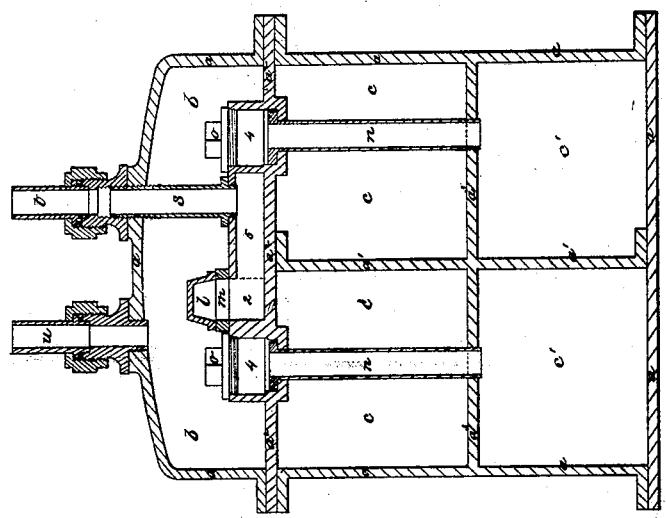
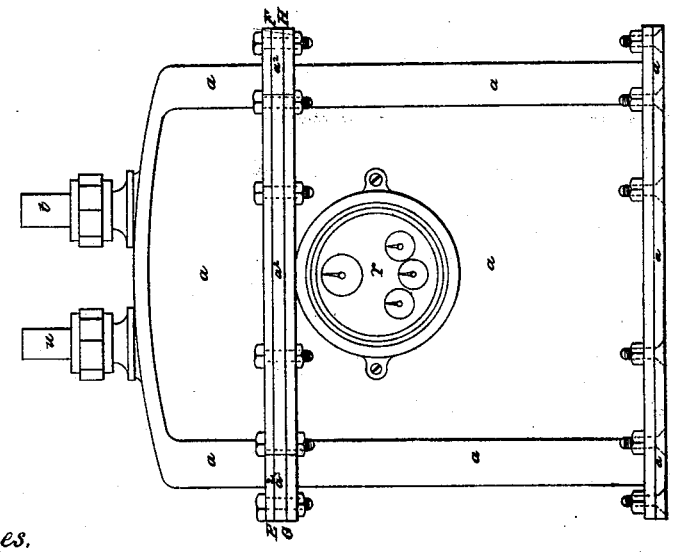
Witnesses.
William Brookes
Alfred George Brookes
Inventor.
John Winsborrow Sheet 3, 5 Sheets.
J. Winsborrow.
Liquid Meter.
Nº 90,858. Patented Nov. 16, 1869.
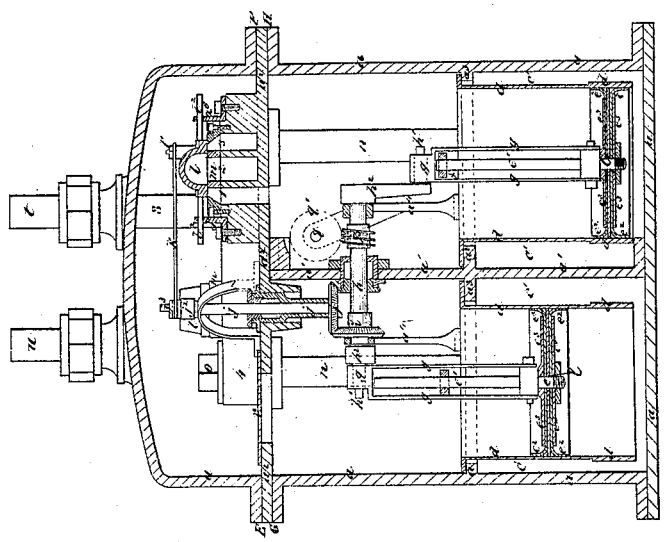
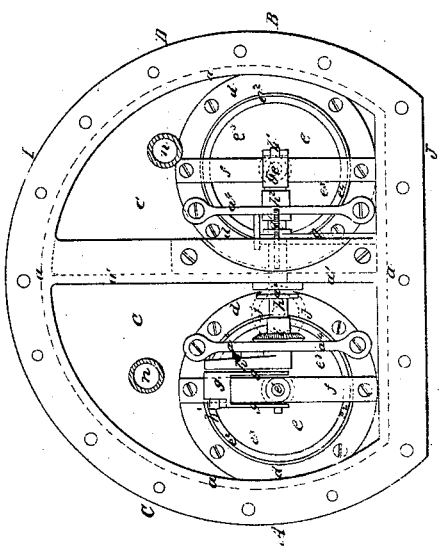
Witnesses:
William Brookes
Alfred George Brookes.
Inventor
John Winsborrow J. Winsborrow.
Liquid Meter.
Nº 96,858.
Patented Nov. 16, 1869.

Witnesses
William Brookes
Alfred George Brookes

Inventor.
John Winsborrow

Sheet 5, 5 Sheets.

J. Winsborrow.

Liquid Meter

N° 96,858.  Patented Nov. 16, 1869.

Witnesses:
William Brookes
Alfred George Brookes

Inventor:
John Winsborrow

United States Patent Office.

JOHN WINSBORROW, OF LIVERMERE ROAD, DALSTON, ENGLAND.

Letters Patent No. 96,858, dated November 16, 1869.

IMPROVEMENT IN LIQUID-METERS.

The Schedule referred to in these Letters Patent and making part of the same.

*To all whom it may concern:*

Be it known that I, JOHN WINSBORROW, of Livermere Road, Dalston, in the county of Middlesex, England, have invented new and useful Improvements in "Apparatus for Measuring Water and other Liquids, which improvements are also applicable in obtaining motive power;" and I do hereby declare that the following is a full, clear, and exact description thereof, which will enable others skilled in the art to make and use the same, reference being had to the accompanying drawings, forming part of this specification.

The object of this invention is to obtain uniformity in the pressure upon the several parts of a meter, consequently greater accuracy, with a minimum of wear and tear in working, together with correct measurement of the liquid passed through.

The invention is particularly applicable in places where the pressure of the flow of the supply to be measured is very variable. For this purpose, pistons, preferably vertical ones, are arranged to work in cylinders that are open at each end, and that communicate with separate chambers, which are supplied through passages and slide-valves operated from a rotary axis. This axis receives motion by bevelled or other suitable gear from the crank-shaft, connected to the piston-rods, said shaft communicating motion, by suitable gear, to the index-wheel work for registering the motions of the pistons, and, consequently, the amount of liquid measured. By these means, the use of stuffing-boxes to the piston-rods is rendered unnecessary, and the friction and consequent wear are avoided. The liquid to be measured passes into the valve-chamber, and thence, through the alternate ports of the valves, to the respective ends of the cylinders. The outlet for the measured liquid through the valve-chamber from the valve-passages is by a screw-pipe, adapted to screw in the valve-passage, and in the cover of the valve-chamber; and, when screwed in with packing on the valve-passage, it can be made secure on the cover by a screw-nut or other suitable means. The measured fluid passes off through the central ports. The pistons are packed with pairs of cups or dishes of gutta-percha.

In order to make the invention more fully understood, I will, by the aid of the accompanying drawings, proceed to describe the same.

Figure 2 is an external or front view of the same.

Figure 5:
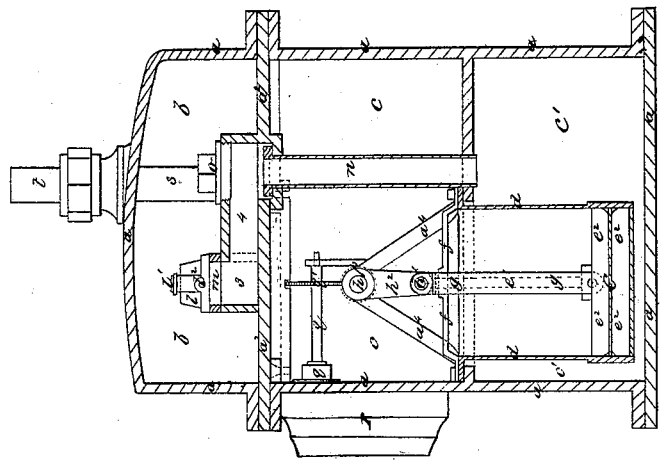
Figure 13:
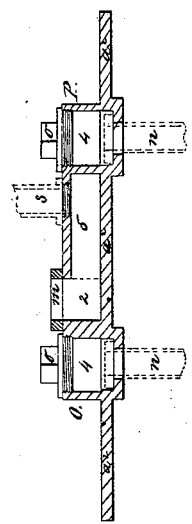
Figure 10:
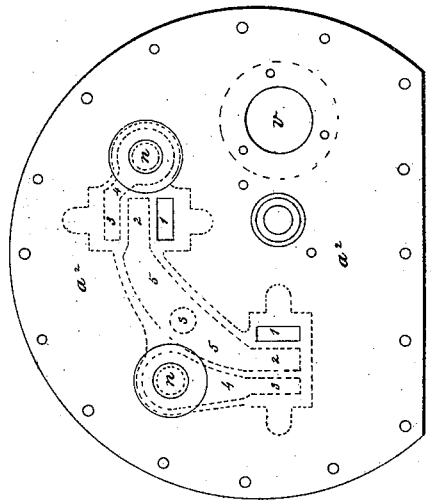

Figures 3, 4, and 5, are vertical sections of the same.

Figure 6:
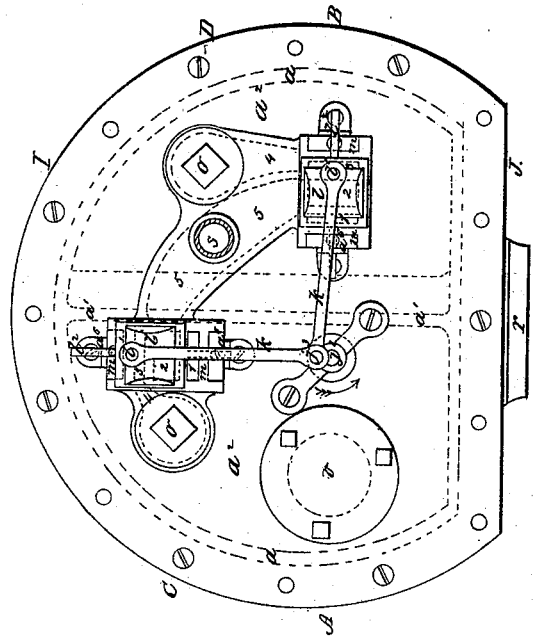
Figure 1:
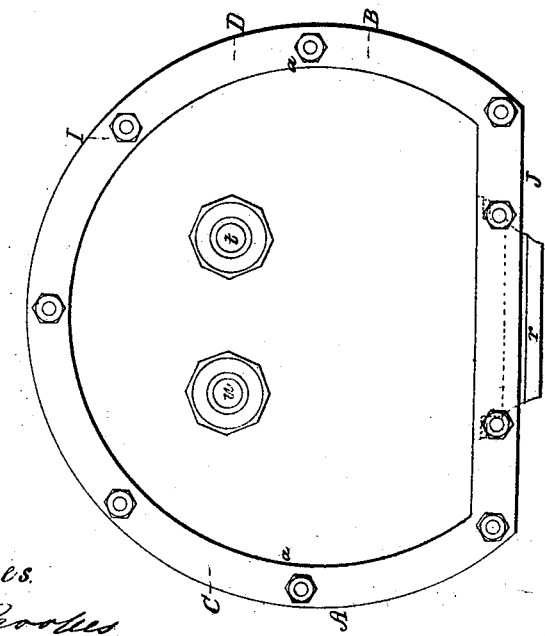
Figure 1 represents a plan or top view of my improved meter.
Figure 8:
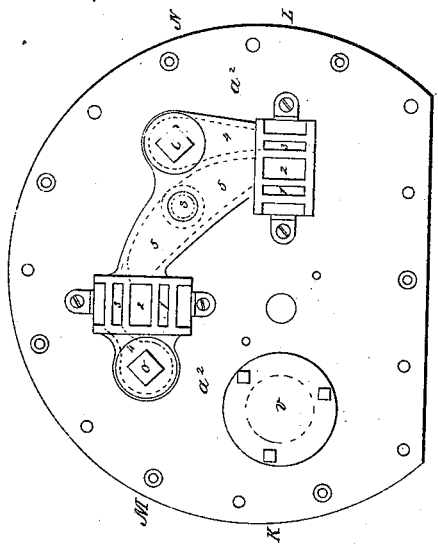
Figure 9:
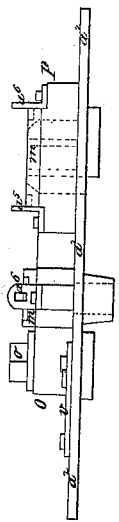
Figure 13:
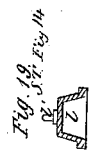
Figures 14, 15, 16, 17:
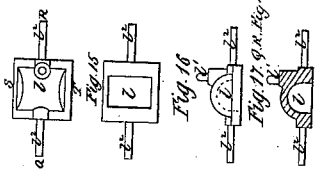
Figure 18:
Figure 11:
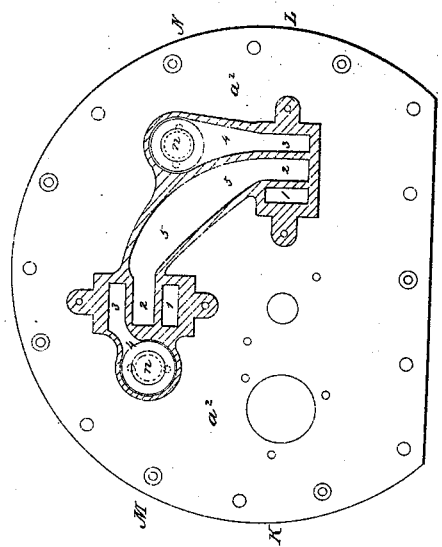
Figure 12:
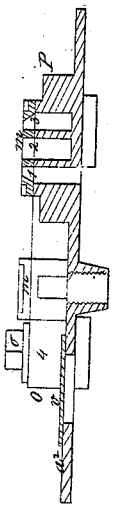
Figure 21:
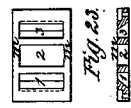
Figure 23:
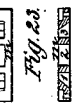
Figure 20:
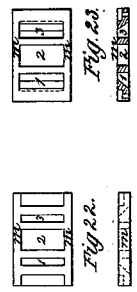
Figure 22:
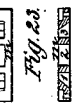

Figures 6 and 7 are horizontal sections, showing the interior of the apparatus.

Figures 8, 9, 10, 11, 12, 13, 14, 15, 16, 17, 18, 19, 20, 21, 22, and 23, are detail views to be hereinafter referred to.

Similar letters of reference indicate corresponding parts.

$a$ is the outer frame or case, which is divided, by the vertical partition $a^1$ and the horizontal partition $a^2$, into three chambers.

The upper chamber $b$ is for the action of the valves, and to receive the liquid in its passage to be measured, while the other two chambers are again subdivided, by horizontal partitions $a^3$ $a^3$, respectively, into chambers $c$ $c'$, $c$ $c'$.

The partitions $a^3$ $a^3$ are formed each to receive a cylinder, $d$, which opens, at one end, into a chamber, $c$, and at its other end into a chamber, $c'$, as shown in fig. 3.

Each cylinder $d$ is fitted with a piston, $e$, the piston-rods $e^1$ of which pass through holes formed for them, as guides, in bars $f$, that are arranged across the upper parts of the cylinders, to guide the piston-rods in their to-and-fro motions in the cylinders.

The pistons $e$ are, by links $g$ $g$, connected with crank-pins $h^1$ $h^1$, on the cranks $h^2$ $h^2$, of an axis, $h$, which is supported in standards $a^4$ $a^4$, that project from the cylinders, so as to be capable of freely revolving in the bearings formed for it in the upper ends of the said standard $a^4$ $a^4$.

In order to prevent the passage of fluid from one side of the partition $a^1$ to the other side of it, where this axis passes through it, this passage is provided with a stuffing-box, $a^5$, or is otherwise suitably packed.

Upon the axis $h$ is mounted a bevelled pinion, $i$, the teeth of which take into the teeth of a bevelled pinion, $j$, affixed on a vertical shaft, $j^1$, which passes, through a packed bearing formed for it in the partition $a^2$, into the chamber $b$, where there is applied to it the crank $j^2$, carrying a crank-pin, $j^3$, which, by links $k$ $k$, is connected to pins $e^1$, projecting from slide-valves $l$, so as to cause those valves, during the revolution of the shafts $h$, to slide to and fro on their seats $m$.

The drawings clearly show the form of the valves and their seats, especially figs. 3, 14, 15, 16, 17, 18, and 19, 20, 21, 22, and 23.

It will be seen that the valves are guided in their to-and-fro motion by stems $l^2$, which are affixed to each valve $l$, and which pass through holes formed for them in the fixed standards $a^6$.

Each valve-seat $m$ is formed with three ways or ports, 1, 2, 3.

The ports 1 and 3 are those by which the liquid to be measured passes from the chamber $b$ to one or the other end of a cylinder, $d$, and the port 2 in each valve-seat is that by which the liquid passes away from the cylinder through one and then the other of these ports 1 and 3, after it has acted on the piston therein.

Each port 1 opens direct into a chamber, $c$, while each port 3 opens into a channel, 4, which, by a pipe, $n$, fig. 5, communicates with a chamber, $c'$.

In order to facilitate the application of these tubes $n$, it will be seen that each of them is passed through an opening in the upper part of its passage 4, and is packed into the lower part of that passage, and screwed into its partition $a^3$, and that the opening in the upper part of each passage 4 is then closed by a screw-plug, $o$, as is clearly shown in figs. 4 and 5, 8 and 11.

The ports or passages 2 2 open into a horizontal passage, 5, which, by means of a vertical pipe, $s$, communicates with the outlet-passage $t$.

The axis $h$ has also applied to it a screw-wheel, $p$, which acts on the teeth of a pinion, $q^1$, applied to a shaft or axis, $q$, which passes through a stuffing-box, $q^2$, into a chamber, $r$, as seen in fig. 5, to actuate suitable wheel-work for registering the quantity of liquid passed through the apparatus, as is well understood by persons acquainted with gas and other meters.

As the ends of the cylinders $d$ open into the chambers $c\ c'$, the pressure on all parts of them is about the same, and, consequently, they may be made very light, in addition to the necessity for stuffing-boxes to the piston-rods being avoided.

The packing to the pistons $e$ is obtained by the use of cups or dishes $e^2\ e^2$, formed of gutta-percha, and held in the opposite sides of the pistons by means of the disks $e^3\ e^3$, as shown in fig. 3.

The passages 4 and 5, with those immediately under the valve-seat, are formed in the casting of the plate or partition $a^2$.

The action of the apparatus is as follows:

The water or other liquid to be measured is conducted into the apparatus through a pipe, $u$, into the chamber $b$. Thence it passes, alternately, through the ports 1 and 3, to the respective compartments $c\ c'$. Supposing the water or other liquid, for the time being, to be passing in through a port, 3, into a chamber, $c'$, it will act upon the piston $e$, to move it up to the end of its stroke, when the valve $l$ will have changed so as to close that port 3 from the chamber $b$, and then open it through the valve $l$ to the port 2 of the valve-seat, and thereby open the port 1, for the passage of liquid therethrough from the chamber $b$ to the chamber $c$, to act on the opposite side of that piston $e$, and move it back in the opposite direction. The water or other liquid which had passed in, as just explained, by the port 3, will now flow out by the same port 3, and, by its valve $l$, be conducted, through the port 2, and thence, by the passage 5 and pipe $s$, to the outlet-passage $t$, and so on, without interruption.

V is a movable cover to an opening in the partition $a^2$, to facilitate an inspection of the wheels $i$ and $j$, to see that they are properly in gear before putting on that portion of the case which forms the cover to the chamber $b$.

The apparatus is also applicable for use, under the pressure of a column of liquid, as a motive-power engine. In this case, a shaft set in motion by the pistons may be employed to give the desired motion.

Having thus described my invention,

What I claim as new, and desire to secure by Letters Patent, is—

A meter, for measuring liquids, combining two vessels, $d\ d$, open at the bottom, and arranged in different chambers on the same level, pistons $e\ e$, operated by the pressure of the liquid, a double crank-shaft, $h$, operated by the pistons, a registering-device, operated by the worm $p$, and a valve-gear, operated from shaft $h$, which allows the vessels $d$ to be alternately filled and emptied, in the manner described.

In testimony whereof, I have signed my name to this specification, in the presence of two subscribing witnesses.

JOHN WINSBORROW.

Witnesses:
 ALPEA DONNISON, 71 *Cornhill, London.*
 JAMES E. NAYLOR, *His Clerk.*